(12) United States Patent
Forster et al.

(10) Patent No.: US 9,941,569 B2
(45) Date of Patent: Apr. 10, 2018

(54) METHOD OF MANUFACTURING A RADIO FREQUENCY IDENTIFICATION DEVICE

(75) Inventors: Ian J. Forster, Essex (GB); Christian K. Oelsner, Simpsonville, SC (US); Robert Revels, Heath Springs, SC (US); Benjamin Kingston, Suwanee, GA (US); Peter Cockerell, Pasadena, CA (US); Normal Howard, Essex (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 348 days.

(21) Appl. No.: 13/160,326

(22) Filed: Jun. 14, 2011

(65) Prior Publication Data

US 2012/0061473 A1    Mar. 15, 2012

Related U.S. Application Data

(60) Provisional application No. 61/354,380, filed on Jun. 14, 2010, provisional application No. 61/354,388, (Continued)

(51) Int. Cl.
*G06K 19/06* (2006.01)
*H01P 11/00* (2006.01)
(Continued)

(52) U.S. Cl.
CPC .......... *H01P 11/003* (2013.01); *B23K 26/364* (2015.10); *B32B 38/10* (2013.01);
(Continued)

(58) Field of Classification Search
USPC .......................................... 235/492
See application file for complete search history.

(56) References Cited

U.S. PATENT DOCUMENTS 2,961,746 A    11/1960  Lyman
3,240,647 A    3/1966   Morgan
(Continued)

FOREIGN PATENT DOCUMENTS

CN    101 341 501    12/2006
CN    101300591      11/2008
(Continued)

OTHER PUBLICATIONS

"Finecut Narrow Web Laser Cutting Systems," Spartanics®, www.spartanics.com, 2 pages, no date shown.
(Continued)

*Primary Examiner* — Rafferty Kelly
(74) *Attorney, Agent, or Firm* — Avery Dennison Retail Information Services, LLC (57) ABSTRACT

The present invention relates to a method of manufacturing an antenna for a radio frequency (RFID) tag. A web of material is provided to at least one cutting station in which a first pattern is generated in the web of material. A further cutting may occur to create additional modifications in order to provide a microchip attachment location and to selectively tune an antenna for a particular end use application. The cutting may be performed by a laser, die cutting, stamping or combinations thereof.

16 Claims, 8 Drawing Sheets

Related U.S. Application Data filed on Jun. 14, 2010, provisional application No. 61/354,393, filed on Jun. 14, 2010.

(51) Int. Cl.

| | | |
|---|---|---|
| *B32B 38/10* | (2006.01) | |
| *G06K 19/077* | (2006.01) | |
| *G06K 19/07* | (2006.01) | |
| *B23K 26/364* | (2014.01) | |
| *B32B 37/12* | (2006.01) | |
| *B32B 38/00* | (2006.01) | |

(52) U.S. Cl.
CPC ..... *G06K 19/0723* (2013.01); *G06K 19/0775* (2013.01); *G06K 19/07718* (2013.01); *G06K 19/07749* (2013.01); *G06K 19/07754* (2013.01); *G06K 19/07786* (2013.01); *B32B 37/12* (2013.01); *B32B 38/145* (2013.01); *B32B 2305/10* (2013.01); *B32B 2307/302* (2013.01); *B32B 2317/12* (2013.01); *B32B 2519/02* (2013.01); *Y10T 29/49016* (2015.01); *Y10T 29/49018* (2015.01); *Y10T 29/49117* (2015.01); *Y10T 29/49156* (2015.01); *Y10T 29/5317* (2015.01); *Y10T 29/53174* (2015.01); *Y10T 156/1052* (2015.01); *Y10T 428/24802* (2015.01); *Y10T 428/24917* (2015.01); *Y10T 428/2809* (2015.01); *Y10T 428/2817* (2015.01)

(56) References Cited

U.S. PATENT DOCUMENTS

| | | | |
|---|---|---|---|
| 3,938,931 | A | 2/1976 | Emmel |
| 4,369,557 | A | 1/1983 | Vandebult |
| 4,664,966 | A | 5/1987 | Bailey et al. |
| 4,711,996 | A | 12/1987 | Drexler |
| 4,717,438 | A | 1/1988 | Benge |
| 4,745,288 | A | 5/1988 | Hurley et al. |
| 4,900,386 | A | 2/1990 | Richter-Jorgensen |
| 5,142,270 | A | 8/1992 | Appalucci |
| 5,161,276 | A | 11/1992 | Hutton et al. |
| 5,331,443 | A | 7/1994 | Stanisci |
| 5,434,917 | A | 7/1995 | Naccache et al. |
| 5,566,441 | A | 10/1996 | Marsh |
| 5,632,842 | A | 5/1997 | Oliver |
| 5,645,932 | A | 7/1997 | Uchibori |
| 5,656,115 | A | 8/1997 | Tanno et al. |
| 5,708,419 | A | 1/1998 | Isaacson et al. |
| 5,709,484 | A | 1/1998 | Dorner |
| 5,759,422 | A | 2/1998 | Schmelzer et al. |
| 5,725,935 | A | 3/1998 | Rajan |
| 5,751,256 | A | 5/1998 | McDonough et al. |
| 5,754,256 | A | 5/1998 | Kim |
| 5,800,724 | A | 9/1998 | Habeger et al. |
| 5,861,809 | A | 1/1999 | Eckstein |
| 6,072,383 | A | 6/2000 | Gallagher, III et al. |
| 6,100,804 | A | 8/2000 | Brady et al. |
| 6,147,662 | A | 11/2000 | Grabau et al. |
| 6,161,276 | A | 12/2000 | Droz |
| 6,164,551 | A | 12/2000 | Altwasser |
| 6,191,382 | B1 | 2/2001 | Damikolas |
| 6,259,369 | B1 | 7/2001 | Monico |
| 6,265,977 | B1 | 7/2001 | Vega et al. |
| 6,313,747 | B2 | 11/2001 | Imaichi et al. |
| 6,320,556 | B1 | 11/2001 | Cyman et al. |
| 6,333,721 | B1 | 12/2001 | Altwasser |
| 6,352,497 | B1 | 3/2002 | Hensley et al. |
| 6,353,420 | B1 | 3/2002 | Chung |
| 6,400,323 | B2 | 6/2002 | Tasukawa et al. |
| 6,424,315 | B1 | 7/2002 | Glenn et al. |
| 6,451,154 | B1 | 9/2002 | Grabau et al. |
| 6,466,131 | B1 | 10/2002 | Tuttle et al. |
| 6,476,775 | B1 | 11/2002 | Oberle |
| 6,509,837 | B1 | 1/2003 | Tuttle et al. |
| 6,609,844 | B1 | 8/2003 | Petteruti et al. |
| 6,698,116 | B2 | 3/2004 | Waldron |
| 6,781,508 | B2 | 8/2004 | Tuttle et al. |
| 6,836,215 | B1 | 12/2004 | Laurash et al. |
| 6,839,029 | B2 | 1/2005 | Mendolia et al. |
| 6,933,892 | B2 | 8/2005 | Oberle |
| 6,940,408 | B2 | 9/2005 | Ferguson et al. |
| 6,988,666 | B2 | 1/2006 | Appalucci et al. |
| 7,014,729 | B2 | 3/2006 | Grabau et al. |
| 7,047,624 | B2 | 5/2006 | Vogt |
| 7,116,227 | B2 * | 10/2006 | Eckstein et al. ............. 340/571 |
| 7,122,235 | B2 | 10/2006 | Bourdelais et al. |
| 7,176,053 | B1 | 2/2007 | Dimmler |
| 7,224,280 | B2 | 5/2007 | Ferguson et al. |
| 7,245,227 | B2 | 7/2007 | Winter |
| 7,250,868 | B2 | 7/2007 | Kurz et al. |
| 7,256,738 | B2 | 8/2007 | Mizukawa et al. |
| 7,283,035 | B2 | 10/2007 | Tuttle et al. |
| 7,284,704 | B2 | 10/2007 | Lubow |
| 7,300,863 | B2 | 11/2007 | Pennaz et al. |
| 7,309,007 | B2 | 12/2007 | Kean |
| 7,345,575 | B2 | 3/2008 | Tuttle et al. |
| 7,374,095 | B2 | 5/2008 | Blank et al. |
| 7,463,150 | B2 | 12/2008 | Rajan |
| 7,477,194 | B2 | 1/2009 | Coleman et al. |
| 7,497,004 | B2 | 3/2009 | Cote et al. |
| 7,520,001 | B2 | 4/2009 | Gotoh et al. |
| 7,533,455 | B2 | 5/2009 | Wehr |
| 7,546,671 | B2 | 6/2009 | Finn |
| 7,559,131 | B2 | 7/2009 | Credelle et al. |
| 7,621,451 | B2 | 11/2009 | Berson |
| 7,633,035 | B2 | 12/2009 | Kirmeier |
| 7,641,112 | B2 | 1/2010 | Jensen et al. |
| 7,650,683 | B2 | 1/2010 | Forster et al. |
| 7,681,301 | B2 | 3/2010 | Rodgers |
| 7,836,588 | B2 | 11/2010 | Laskin et al. |
| 7,855,645 | B2 | 12/2010 | Rajan |
| 7,893,385 | B2 | 2/2011 | Rodgers |
| 7,930,815 | B2 | 4/2011 | Coleman et al. |
| 7,997,495 | B2 | 8/2011 | Rodgers |
| 8,033,477 | B2 | 10/2011 | Jones et al. |
| 8,132,734 | B2 | 3/2012 | Lazarowicz et al. |
| 8,146,830 | B2 | 4/2012 | Johnson et al. |
| 8,178,028 | B2 | 5/2012 | Gandhi |
| 8,191,230 | B2 | 6/2012 | Coleman |
| 8,202,567 | B2 | 6/2012 | Kohnle et al. |
| 8,786,510 | B2 | 7/2014 | Coleman et al. |
| 8,981,936 | B2 | 3/2015 | Forster et al. |
| 9,039,866 | B2 | 5/2015 | Forster et al. |
| 9,231,290 | B2 | 1/2016 | Forster et al. |
| 2002/0018880 | A1 | 2/2002 | Young |
| 2002/0025416 | A1 | 2/2002 | Uchibori |
| 2003/0051806 | A1 | 3/2003 | Appalucci |
| 2003/0112202 | A1 | 6/2003 | Vogt |
| 2003/0136503 | A1 | 7/2003 | Green et al. |
| 2004/0075616 | A1 | 4/2004 | Endo et al. |
| 2004/0078957 | A1 | 4/2004 | Forster et al. |
| 2004/0177492 | A1 | 9/2004 | Eckstein et al. |
| 2004/0221952 | A1 | 11/2004 | Hirschmann et al. |
| 2004/0224135 | A1 | 11/2004 | Krebs |
| 2005/0001785 | A1 | 1/2005 | Ferguson et al. |
| 2005/0034995 | A1 | 2/2005 | Gundlach et al. |
| 2005/0035927 | A1 | 2/2005 | Kimura |
| 2005/0083627 | A1 | 4/2005 | Wang et al. |
| 2005/0089664 | A1 | 4/2005 | Utz |
| 2005/0183817 | A1 | 8/2005 | Eckstein et al. |
| 2005/0197074 | A1 | 9/2005 | Cullen et al. |
| 2005/0198811 | A1 | 9/2005 | Kurz et al. |
| 2005/0205202 | A1 | 9/2005 | Chaoui et al. |
| 2005/0206524 | A1 | 9/2005 | Forster et al. |
| 2005/0230486 | A1 | 10/2005 | Halope |
| 2005/0230791 | A1 | 10/2005 | Kanda et al. |
| 2005/0231371 | A1 | 10/2005 | Rowe, Jr. |
| 2005/0274811 | A1 | 12/2005 | Zercher |
| 2005/0284917 | A1 | 12/2005 | Clare et al. |
| 2005/0284941 | A1 | 12/2005 | Lubow |
| 2006/0244662 | A1 | 11/2006 | Bauer |
| 2007/0020932 | A1 | 1/2007 | Maruyama et al. |
| 2007/0040686 | A1 | 2/2007 | Reis |

(56) References Cited

U.S. PATENT DOCUMENTS

| | | |
|---|---|---|
| 2007/0078957 A1 | 4/2007 | Ypya |
| 2007/0094862 A1* | 5/2007 | Posamentier .................. 29/601 |
| 2007/0102190 A1 | 5/2007 | Sakamoto |
| 2007/0130754 A1 | 6/2007 | Fein |
| 2007/0171129 A1* | 7/2007 | Coleman et al. ...... 343/700 MS |
| 2007/0188327 A1 | 8/2007 | Keeton et al. |
| 2007/0246843 A1 | 10/2007 | Yang et al. |
| 2008/0047129 A1 | 2/2008 | Lin et al. |
| 2008/0047130 A1 | 2/2008 | Lin et al. |
| 2008/0083706 A1 | 4/2008 | Kirmeier |
| 2008/0103238 A1 | 5/2008 | Braidwood et al. |
| 2008/0120834 A1 | 5/2008 | Laksin et al. |
| 2008/0128397 A1 | 6/2008 | Gandhi |
| 2008/0128493 A1 | 6/2008 | Jones et al. |
| 2008/0217309 A1 | 9/2008 | Rodgers |
| 2008/0277069 A1 | 11/2008 | Tharp |
| 2009/0230196 A1 | 9/2009 | Johnson et al. |
| 2009/0033582 A1 | 11/2009 | Blenkhorn |
| 2010/0071831 A1 | 3/2010 | Peter et al. |
| 2010/0089535 A1 | 4/2010 | Hosono et al. |
| 2010/0320275 A1 | 12/2010 | Fu |
| 2011/0220276 A1 | 9/2011 | Coleman et al. |
| 2012/0060359 A1 | 3/2012 | Forster et al. |
| 2012/0061473 A1 | 3/2012 | Forster et al. |
| 2012/0064307 A1 | 3/2012 | Forster et al. |
| 2012/0280047 A1 | 11/2012 | Forster et al. |
| 2014/0034739 A1 | 2/2014 | Forster et al. |
| 2014/0047703 A1 | 2/2014 | Forster et al. |

FOREIGN PATENT DOCUMENTS

| | | |
|---|---|---|
| CN | 101 375 463 | 2/2009 |
| CN | 101 541 555 | 9/2009 |
| CN | 101 297 307 | 6/2010 |
| DE | 37 32 825 | 3/1988 |
| DE | 4000372 | 7/1991 |
| DE | 4422338 | 6/1994 |
| DE | 19921130 | 5/1999 |
| DE | 200 05 940 | 8/2000 |
| DE | 696 17 753 | 8/2002 |
| EP | 0 665 705 | 8/1995 |
| EP | 0790123 | 2/1997 |
| EP | 1120796 | 8/2001 |
| GB | 869076 | 5/1961 |
| JP | H07100793 | 4/1995 |
| JP | 2001127410 | 5/2001 |
| JP | 4334704 | 9/2009 |
| JP | 6334704 | 9/2009 |
| TW | 2008/11717 | 3/2008 |
| WO | 9951386 | 10/1999 |
| WO | 2001/054058 | 7/2001 |
| WO | 2001/054226 | 7/2001 |
| WO | 2003/024708 | 3/2003 |
| WO | 2003/054708 | 7/2003 |
| WO | 2003/107266 | 12/2003 |
| WO | 2005/083627 | 9/2005 |
| WO | 2005/089143 | 9/2005 |
| WO | 2007/053355 | 5/2007 |
| WO | 2007/087189 | 8/2007 |
| WO | 2008148527 | 12/2008 |
| WO | 2009118455 | 10/2009 |

OTHER PUBLICATIONS

"Finecut Laser Cutting Systems," Spartanics®, www.spartanics.com, 4 pages, no date shown.
"Fineprint Flatbed Screen Printing Line, Roll-to-Roll," Spartanics®, www.spartanics.com, 2 pages, no date shown.
"Cold Foil for Dummies®," J. Michael Rivera, Wiley Publishing, Inc., copyright 2004.
International Search Report and Written Opinion dated Oct. 6, 2011 for International Application No. PCT/US2011/040379.
International Search Report and Written Opinion dated Oct. 6, 2011 for International Application No. PCT/ US2011/040383.
International Search Report and Written Opinion dated Oct. 6, 2011 for International Application No. PCT/US2011/041743.
International Search Report and Written Opinion dated Oct. 6, 2011 for International Application No. PCT/US2011/040391.
Partial European Search Report dated May 16, 2014 for International Application No. EP13005668.
International Search Report dated Sep. 26, 2007 for Internation Application PCT/US2007/001048 filed Jan. 16, 2007.
Written Opinion dated Mar. 20, 2008 for Internation Application PCT/U52007/001048 filed Jan. 16, 2007.
International Preliminary Report on Patentability dated May 2, 2011 for Internation Application PCT/US2007/001048 filed Jan. 16, 2007.
Extended European Search Report dated Febraury 9, 2010 for European Appllication EP 07 76 2542.
Definition of RFID, Technology.com, printed Mar. 18, 2014, 1 page.
European Search Report dated Feb. 16, 2016 for International Application No. EP13 00 5668.
International Search Report and Written Opinion dated Jan. 12, 2012 for International Application No. PCT/US2011/040386 filed Jun. 14, 2011.
International Preliminary Report on Patentability dated Dec. 14, 2012 for International Application No. PCT/US2011/040386 filed Jun. 14, 2011.

* cited by examiner

METHOD OF MANUFACTURING A RADIO FREQUENCY IDENTIFICATION DEVICE

CROSS-REFERENCE TO RELATED APPLICATION

The present application claims the benefit of U.S. Provisional Application Nos. 61/354,380 filed Jun. 14, 2010, 61/354,388 filed Jun. 14, 2010, and 61/354,393 filed Jun. 14, 2010, all of which are incorporated herein by reference in their entireties.

FIELD OF THE INVENTION

The present invention is in the field of manufacturing radio frequency identification antenna structures for use with radio frequency identification ("RFID") tags, inlays, tickets and labels. More particularly, the invention is directed to a method of manufacturing RFID antennas for RFID devices in a continuous and efficient manner using a combination of cutting techniques that allows for the placement of a microprocessor directly onto an antenna potentially without the need for microprocessor contact extensions such as straps, interposers, or carriers.

BACKGROUND OF THE INVENTION

The use of radio frequency identification (RFID) tags is well known. RFID tags are commonly used in a wide variety of fields such as security-locks for automobiles, to control access to buildings, other security applications, to track and manage inventory, and to provide identification to tagged items.

Typical RFID tags have a microprocessor electrically connected to an antenna. When used to track or manage inventory, the microprocessor stores unique identifying data associated with the inventory. An operator can use an external receiver/reader to retrieve the stored data and process the inventory.

Recently, the demand for RFID tags has increased as companies explore alternative business processes to maintain and/or increase profitability. Traditionally, companies have attempted to predict the sales volume of a particular item at a store and then ship a set number or amount of goods to the store based on the sales volume prediction. This business process has the potential to reduce company profitability, as the sales volume prediction may over estimate the demand, resulting in the store having to inventory and maintain the item for a longer time period than desired. A store may even be forced to mark down the price of an item once the item's saleable life is nearing an end or, in the case of food, expiration is near or been reached (e.g. perishable goods, seasonal items, fashion trends, etc.). Alternatively, the sales volume prediction may underestimate the demand, thereby reducing company sales and impacting profitability as consumers are forced to shop elsewhere to purchase an out of stock product.

RFID tags have the potential to increase company profitability by allowing the company to continuously monitor the supply of a product at a store. Using RFID tags allows a company to quickly respond to low store inventory without having to take physical inventory counts to ensure an adequate supply of goods while avoiding the risks associated overstocking a product. Additionally, a company can monitor the sales rate of a product at a store, which can help the company predict future sales trends so that the company can make alterations within the supply chain as necessary to maintain an appropriate supply and ready availability of goods.

The increased demand for RFID tags has created a need for a manufacturing method that can quickly and efficiently produce RFID tag antennas. One such method is disclosed in U.S. Patent Application No. 2007/0171129 A1. This method includes the steps of, first, providing a reinforced metal foil laminate which includes a foil bonded to a reinforcement layer, and a carrier layer bonded to the metal foil laminate. The method then includes the step of using a rotary die cutter to cut an antenna pattern through the metal foil laminated to the carrier layer. The method concludes with the step of removing an undesired matrix portion of the reinforced metal foil laminate to provide a metal foil laminate antenna disposed on the carrier layer. An RFID tag 5 created by this method is shown in FIG. 1.

Publications, patents and patent applications are referred to throughout this disclosure. All references cited herein are hereby incorporated by reference.

Figures 1, 2:
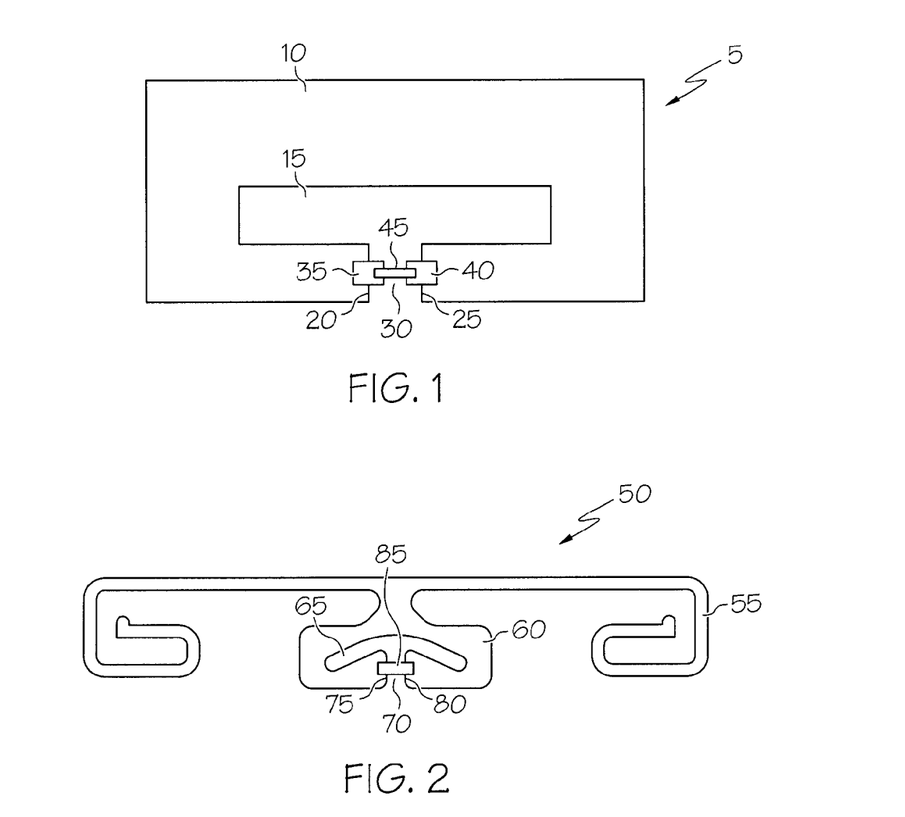
FIG. 1 is a top view of an antenna created by a prior art method.
FIG. 2 is a top view of a complete standard RFID tag created by a method disclosed by the present invention.

With reference to FIG. 1, the RFID tag 5 has an antenna structure 10 formed out of a reinforced conductive layer. The antenna structure has a generally T-shaped opening 15 that defines a first antenna contact end 20 and a second antenna contact end 25 spaced apart from one another by a gap 30. A first contact extension 35 and a second contact extension 40 substantially extend from the first antenna contact end 20 and the second contact end 25, respectively, toward the gap and allow a microprocessor 45 to be electrically coupled to the antenna structure 5. It should be understood that any shape may be suitable for the antenna opening and the reference to a "T" shaped opening is used for exemplary illustrative purposes only.

A rotary die cutter to cut an RFID antenna pattern is advantageous because rotary die cutting is both fast and inexpensive. However, rotary die cutters have poor resolution, and are limited to having a minimum distance between cut lines of 1 mm. Accordingly, the gap 30 of the RFID tag 1 in FIG. 1 creates, at a minimum, a 1 mm void between the first contact antenna end 20 and the second contact antenna end 25. This distance is too great for the microprocessor chip 45 to bridge. As such, the chip 45 cannot be directly coupled to the antenna structure 10. Rather, the first contact extension 35 and the second contact extension 40 must be used to substantially bridge the gap 30 before the chip 45 can be electrically coupled to the antenna structure 10.

An additional problem with using a rotary die cutter to cut a RFID antenna pattern is that the cylindrical die used by the rotary die cutter cannot be quickly or easily changed. Accordingly, the antenna design is not readily changeable, and thus it is often not economically feasible to produce small batches of a particular antenna design due to the constant need to change out die heads. Furthermore, any change in an antenna design would require a large lead-time, as a new cylindrical die must be manufactured each time the antenna design is changed. This can create a large inventory of die heads. The storage of which can occupy valuable factory floor space.

What is needed is an improved method of manufacturing RFID tags that eliminates the respective disadvantages of prior process.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

It is proposed in the present invention to use a laser cutter to cut an antenna pattern in order to overcome many of the problems that are associated with a rotary die cutter. Laser cutters have an extremely high resolution, and thus are capable of creating intricate, precise cuts. Accordingly, a laser cutter can create a gap in an antenna structure that is small enough to allow a direct connection between a microprocessor chip and an antenna structure. Additionally, the computer that controls the cutting path of the laser can easily and quickly be programmed with a variety of drastically different cutting paths. This makes the production of small batches of a particular antenna design economically feasible, and greatly reduces lead-time, as all that is required is a programming change for the new pattern. However, the cutting speed of a laser is limited, and is much slower than that of a rotary die cutter.

By using a laser cutter to create one or more gaps or cuts in an antenna structure created by a rotary die cutter, or a cold foil process to remove larger portions of the design and then using a laser cutting to remove the more intricate or precise areas of the design. The present invention overcomes the above-identified problems associated with using a rotary die cutter alone to form the entire antenna structure for RFID tags or label.

The present invention relates to a method of manufacturing radio frequency identification (RFID) antennas. The method includes the steps of, first, providing a conductive layer and a carrier layer to form the metal foil laminate. The conductive layer can take the form of either a reinforced metal foil laminate that has a metal foil layer which may or may not be bonded to a reinforcement layer. Alternatively, a foil of sufficient mechanical strength can be used without the reinforcement layer. A first cutter then cuts a basic antenna pattern or design through the conductive layer to the carrier layer to create a first RFID antenna structure. Next, a computer controlled laser ablates a portion of the metal foil laminate down to the carrier layer to cut a microprocessor attachment portion and/or other areas too intricate or delicate to be cut by the first cutter in the basic antenna pattern. The last step of the method involves separating an undesired matrix portion of the conductive layer from the RFID antenna structure to provide a conductive layer for the RFID antenna structure disposed on the carrier layer.

In a further exemplary embodiment of the present invention a method of manufacturing a modified RFID tag is provided and includes the steps of, first, providing a conductive layer and a carrier layer that is at least partially bonded to the conductive layer. A first cutter, which may be a rotary die cutter, cold foil process or laser, is used to cut a basic antenna pattern through the conductive layer to the face or upper surface of the carrier layer. Then, using a computer controlled cutting laser, which may be the same as the first cutting device, to ablate the conductive layer, a microprocessor attachment portion or other intricate portions is cut in the basic antenna pattern through the conductive layer to the carrier layer to create an antenna structure for a RFID device. Additional cuts may be made to further refine the antenna design.

As used herein, an exemplary cold foil process refers to printing an adhesive or other curable pattern onto a substrate then applying a foil layer over the pattern, laminating the foil to the pattern so that the foil sticks to the pattern and then stripping away the foil, leaving the pattern on the substrate covered with the foil layer.

The microprocessor attachment portion which is illustrative of one of the more intricate patterns or areas to be cut by the laser may take any suitable shape and in one exemplary embodiment is a substantially T-shaped void in the basic antenna structure to form a dipole antenna. The microprocessor attachment portion defines a gap that separates a first contact antenna end from a second antenna contact end. Next, when necessary, a matrix portion is separated from the conductive layer and the RFID antenna structure to provide a conductive layer RFID antenna structure that is disposed on the carrier layer. Alternatively, no matrix may be removed from the antenna structure and instead the cutting creates a sufficiently wide separation in the foil so that sections of the antenna do not touch thereby shorting out the circuit which is formed during cutting.

A microprocessor is then directly attached to the microprocessor attachment portion of the RFID antenna structure to create a RFID device such as a tag, ticket or RFID label or inlay once the cutting has been completed. The microprocessor is attached directly to the microprocessor attachment portion at the first antenna contact end and the second antenna contact end while extending over the gap. In order to create the attachment area, a computer controlled cutting laser is used to ablate select or predetermined portions of the standard RFID antenna structure to create a modified RFID tag. The last step of the method involves removing the modified RFID tag from the carrier layer. It will be appreciated that, although the invention has been described with a microprocessor with two attachment points or ports, the same principles apply for microprocessors with a larger number of attachment points or ports, for example four attachment points or ports. In this way, a microprocessor may be directly attached to the antenna without the need for a strap or conductive extensions applied to the chip.

In a still further exemplary embodiment of the presently described invention, a conductive structure for use with a RFID tag is provided and includes a conductive layer that has first and second sides and a first antenna pattern where the first pattern is modified by creating a second antenna pattern that is distinct from the first antenna pattern. The second antenna pattern defines at least one attachment port. Each of the first and second patterns extends through each of the first and second sides of the metal foil layer to the carrier layer. A carrier layer supports the metal foil layer and a microprocessor chip is attached to the microprocessor attachment portion of the second antenna pattern.

The foregoing embodiment may also include a third antenna pattern that is distinct from each of the first and second antenna patterns. Alternatively, the third pattern can be partially coincident with one or both of the first or second patterns. In addition, the first, second and/or third patterns can cooperate to form a RFID antenna structure. The third pattern may also act or serve independently and may not form any part of the conductive antenna structure and may provide another variable pattern used for information purposes.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such.

Referring now to FIG. 2, a top view of a completed exemplary RFID tag 50 created by a method of the present invention is shown. The RFID tag 50 has an antenna structure 55 formed out of a conductive layer. The antenna structure 55 has a center portion 60 with a generally T-shaped opening 65. It should be understood that any configuration or shape may be produced depending on the requirements of the end user application.

The generally T-shaped opening 65 defines a gap 70 that separates a first antenna contact end 75 from a second antenna contact end 80. A microprocessor 85 can then be directly electrically coupled to the first and second contact antenna ends 75, 80 while extending over the gap 70. It should be noted that the microprocessor 85 is directly electrically coupled to the standard antenna structure 55 without the use of any contact extensions, e.g. strap, as a result of the methodology used to create the standard antenna structure 55, which will be explained in detail below. However, the present invention contemplates that a contact extension may be utilized but is not required.

Figure 3:
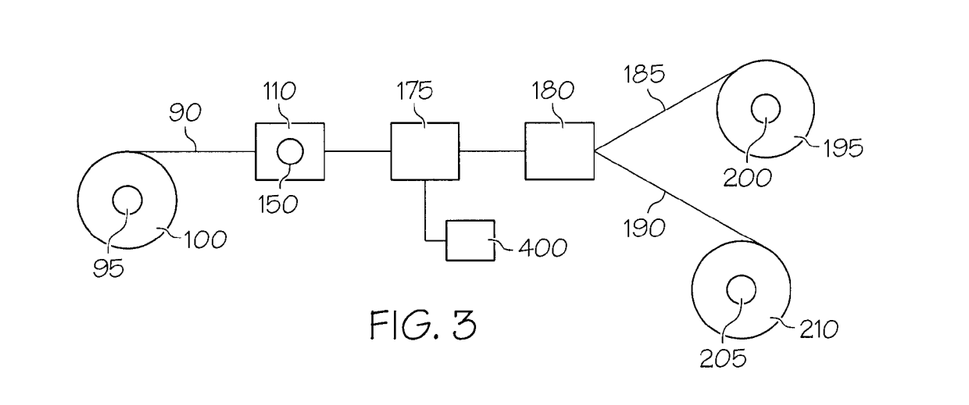
FIG. 3 depicts a roll-to-roll process for manufacturing a standard RFID antenna structure in accordance with an aspect of the present invention.
Figure 7:
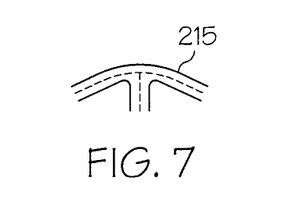
FIG. 7 is a top view of an exemplary primary laser cutting path utilized by the present invention.

Having now described the RFID tag 50, a schematic illustration of an apparatus by which the antenna structure 55 is created is set forth in FIG. 3, which shows a roll-to-roll process for manufacturing an RFID antenna structure in accordance with an aspect of the present invention. A web 90 is dispensed via an unwinder 95 from a web roll 100 and fed to a rotary die cutter 110 which has a rotary die 150. The web 90 exits a first cutter 110, and is fed into a laser cutter 175. A laser cutting path 215 (an exemplary embodiment of which is provided in detail in FIG. 7) is programmed into a computer 400 that controls the laser cutter 175.

The programmable laser can also be used to cut other patterns into the material, such as logos, names, trademarks, images or the like such that an RFID device can be created and information about the retailer, customer, manufacturer, marketing or promotional event, theme, etc. can be included with the device.

An exemplary laser suitable for use in the present invention includes a ytterbium laser, which pulses at about 48 kHz in a wavelength of 1024 nm. Ideally, the energy of the laser is not apparent from the surface of the substrate, such that there are no areas of surface roughness, blacking or die strikes such as one may see with a die cutter.

Continuing with reference to FIG. 3, the web 155 exits the laser cutter 175 and is fed into a stripper 180, if necessary. When provided, the stripper 180 separates the matrix web 190 from the antenna structure to create a finished antenna structure web 185. It should be noted that the reinforcement layer 135 (FIG. 4), when provided, may be necessary to bolster the strength of the conductive layer 145 so as to prevent the tearing or ripping of the conductive layer 145 during the processing/cutting of the antenna structure web 185 if the conductive layer isn't sufficiently strong to withstand processing. Alternatively, a foil or other conductive structure such as a web or mesh of wires with sufficient mechanical strength may be used. In the latter instance, the foil matrix, when collected, is 100% recyclable. The antenna structure web 185 has a succession of antenna structures disposed on the carrier layer 130. The antenna structure web 185 is wound into an antenna structure roll 195 by a first rewinder 200, while the matrix web 190 is wound into a matrix roll 210 by a second rewinder 205.

Figure 4:
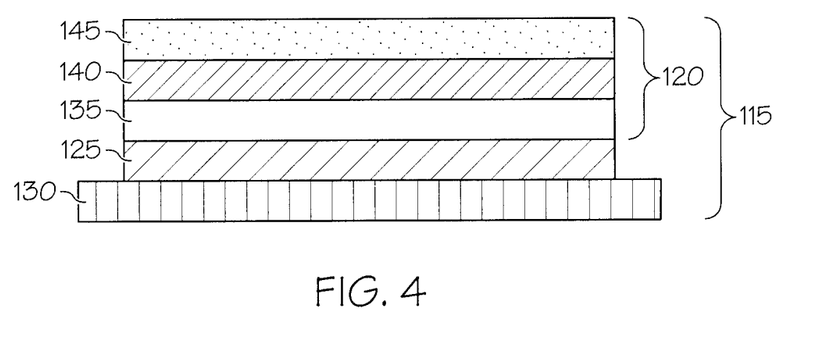
FIG. 4 is a cross sectional view of a web used in the roll-to-roll process disclosed by the present invention.

Referring now to FIG. 4, a cross sectional view of the web 115 used in the roll-to-roll process is shown. The web 115 may be selected from paper, fabric (woven and non-woven, synthetic or natural fabrics), plastics or other suitable material. The web 115 may include a conductive layer 120 bonded to a carrier layer 130 by a first adhesive layer 125. In one embodiment of the present invention, the first adhesive layer 125 may have a pattern of optical brighteners (not shown) disposed within the adhesive layer used as registration marks, in order to assist in the cutting process by the laser. The optical brighteners are detectable by the laser and indicate to the laser where to cut the pattern for the antenna structure. The optical brighteners may also be printed on top of the adhesive layer rather than being present within the adhesive layer. Additionally, the optical brighteners may be printed on the carrier layer 130 as opposed to being mixed in the adhesive, that is the optical brighteners can be printed, sprayed or otherwise applied to the carrier layer prior to the application of the adhesive and adjacent the area where the adhesive is applied. In this embodiment, it is preferred that the adhesive layer is clear or transparent so that the optical brighteners may be seen through the adhesive layer.

Alternatively, other triggers or elements can be used by the system to allow the laser to begin cutting, such as printed and unprinted areas of the web, coated and uncoated adhesive areas, punches, cuts, slits in the web and the like.

In a preferred embodiment, the optical brighteners are a fluorescent powder, in an amount that is approximately 1% by weight of the adhesive and more preferably 0.5% by weight of the adhesive.

In one embodiment of the present invention, the web may have a series of printed registration marks 14 along the longitudinally and/or transversely extending sides of the first adhesive layer (depending on the direction of web travel). The registration marks assist in alignment of the antenna patterns in the conductive layer, and are typically provided in a machine direction which is the direction the web or sheet travels through the machine. Optical brighteners may serve as registration marks or the registration marks may be printed using a wide variety of ink on top of individual optical brighteners. In another embodiment, the registration marks may be made out of optical brighteners and the optical brighteners may be incorporated within the adhesive layer, on top of the adhesive layer, or on top of the first face of the substrate as well.

In one embodiment of the present invention, the web or sheet may include only a single layer of foil which may be supported by a carrier or support that is removable prior to the foil being adhered to the carrier and is used only to support foil during the processing. Alternatively, the foil may be of sufficient thickness that it does not require a supporting layer and has sufficient strength to withstand the processing of the roll to roll process and subsequent cutting.

The carrier layer 130 may be made out of any material or combination of materials (paper, fabric, plastics, etc.) that allows the carrier layer 130 to be flexible so as to facilitate the manufacture of the carrier layer 130 as a continuous web that can be wound into a roll form for use in a roll-to-roll process. Webs may also be collected in a fanfold or zigzag configuration. Examples of such materials include, but are not limited to, polyester films, polyethylene terephthalate films, polyimide films, fabric or cloth, or paper materials (card stock paper, bond paper, etc.). The adhesive layer 125 may be applied to the carrier layer 130 by flood coating or roll coating, and may be a pressure activated adhesive or pressure sensitive adhesive.

It should be understood that while the present invention is described as a roll to roll arrangement using a web, the invention may be practiced in a sheet feed configuration. In a sheet feed process, sheets of material (paper, plastic, fabric, etc.) are provided from a hopper or sheet feeder and then the sheets are collected once processing is completed. The sheets of material are usually collected in a stack.

When a reinforcement layer is used to create a reinforced conductive layer 120 a metal foil layer 145 is bonded to a reinforcement layer 135 by a second adhesive layer 140. The metal foil layer 145 may be constructed out of any suitable conductive material, such as aluminum, copper, silver, gold and the like. Combinations of conductive materials may also be used. In addition, the conductive material can be created by printing of conductive ink, coatings of conductive fluids or solutions, flakes or other suitable processes. The second adhesive layer 140 may be a general-purpose permanent pressure sensitive adhesive, pressure activated adhesive, or any other suitable adhesive. The second adhesive layer 140 may be applied to the reinforcement layer 135 by flood coating, roll coating or pattern coating adhesive only in areas where antennas are to be formed. Alternatively, the adhesive may be a two part adhesive, in which one part is coated on the web and is not tacky and then upon the coating of the second part, in selective areas where the antenna is to be formed, the adhesive becomes tacky. A two part adhesive may also be used where a foil is in direct association with the carrier and no reinforcement layer is used.

The present invention contemplates that optical brighteners may also be contained in the second adhesive or on top of the second adhesive layer to serve a similar purpose as they do in the first adhesive layer 125. Optical brighteners 23 may be contained in the second adhesive layer 20 as opposed to or in addition to optical brighteners 23 in the first adhesive layer 125.

Figure 5:
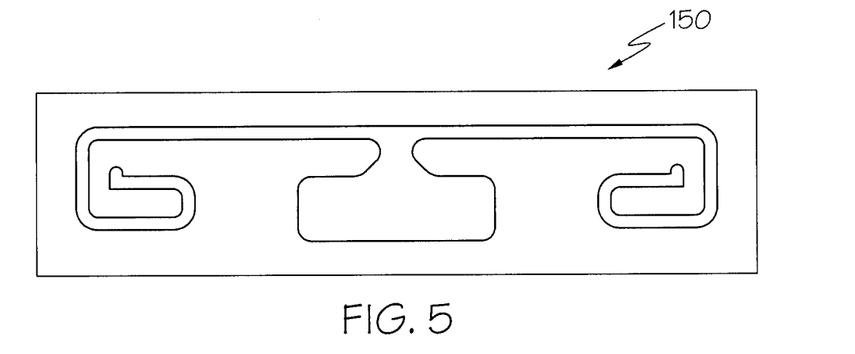
FIG. 5 is a top view of a die used by a rotary die cutter as disclosed by the present invention.
Figure 6:
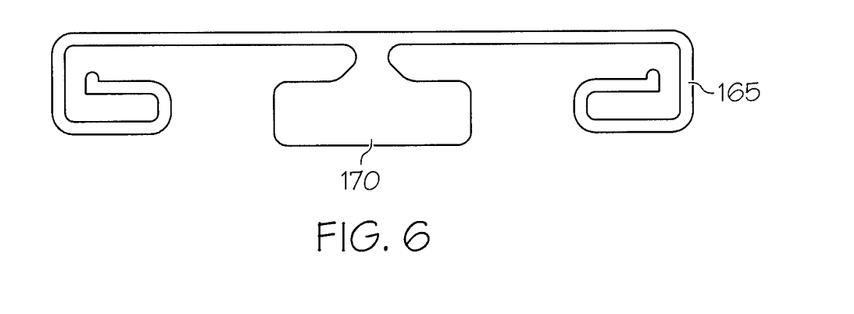
FIG. 6 is a top view of a basic antenna structure cut by the die shown in FIG. 3.

When a rotary die cutter or cold foil process is used, the rotary die cutter or cold foil process 110 is equipped with a die 150 (an exemplary embodiment of which is shown in detail in FIG. 3) having a shape generally mirroring the outline of an antenna structure to be formed, but without the opening for the attachment of the chip (e.g. T-shaped opening) or other configuration that will be imparted to the design (an exemplary embodiment of which is shown in detail in FIG. 5). As the web 90 is fed through the rotary die 110, the rotary die 110 causes the die 150 to cyclically cut or press into the web 90 as with a cold foil process, up to the carrier layer 130 through the metal foil layer 120 and the first adhesive layer 125, thereby delineating a succession of antenna structures from an undesired portion referred to as a matrix web 190. An exemplary antenna structure 165 is shown in FIG. 6. The antenna structure 165 has a center portion 170. The antenna structure 165 does not yet have a microprocessor attachment area defined in the center portion 170. It should be understood that other more intricate areas may also not be formed during the first cutting and reference to the attachment feature is intended to be illustrative and not limiting.

Figure 8:
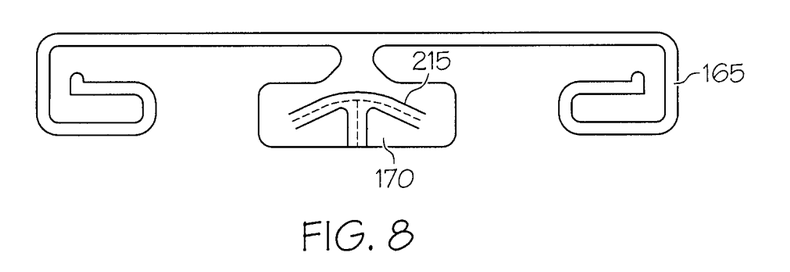
FIG. 8 is a top view showing the placement of the primary laser path shown in FIG. 7 on the basic antenna structure shown in FIG. 6.

Referring back to FIG. 3, the web 90 exits the rotary die cutter 110 and is fed into a laser cutter 175. A laser cutting path 215 (an exemplary embodiment of which is shown in detail in FIG. 7) is programmed into a computer 400 that controls the laser cutter 175. As the web 90 is fed through the laser cutter 175, the laser cutter 175 positions the laser cutting path 215 onto the center portion 170 of the antenna structure 165 that was created by the rotary die 110, as shown in FIG. 8. As the antenna structures advance through the laser cutter 175, the laser cutter 175 traces the position of the laser cutting path 215 while continuously ablating the conductive layer 120 and the adhesive layer 125 to create a microprocessor attachment area in the center portion of the basic antenna structures. The laser may create or refine additional areas of the antenna which are too fine for the die cutter to process. Where a reinforcement layer is present, the laser may also cut through the reinforcement layer and second adhesive layer.

Figure 9:
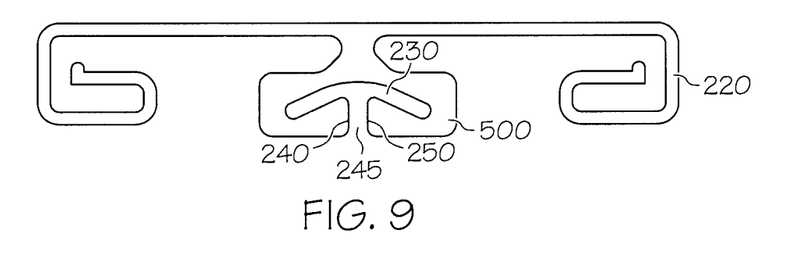
FIG. 9 is a top view of a standard antenna structure.

A succession of finished antenna structures is produced in the conductive layer 120 disposed on the carrier layer 35 while the structures are still surrounded by the matrix web 190 which is subsequently stripped off. A finished antenna structure 220 is shown in FIG. 9. The finished antenna structure has a center portion 500 (e.g. microprocessor attachment area) having an opening 230, which in the present example is generally "T" shaped. The opening 230 defines a gap 245 that separates a first antenna contact end 240 from a second antenna contact end 250.

It should be appreciated that the laser cutter 175 ablates the conductive layer 120 and the adhesive layer 125 to create the opening for attaching the microprocessor. Accordingly, no material exists in the opening for the stripper 180 to remove as the stripper 180 separates the matrix web 190 from the antenna structure created by the first cutting process that was used to create the general antenna structure web 185. The microprocessor attachment area of antenna structure is particularly narrow. Therefore, if the die 150 were shaped to also cut the microprocessor attachment opening, the material being removed from the microprocessor attachment area during the separation of the antenna structure web 185 from the matrix web 190 would likewise be particularly narrow, and therefore weak and especially prone to tearing. This can be problematic, as the tearing could potentially damage the antenna structure which may destroy the functionality of the antenna. Furthermore, tearing of this nature would result in material remaining in the microprocessor attachment that would have to be manually removed, resulting in decreased production rates and increased manufacturing costs.

While the laser cutter 175 creates only the microprocessor attachment that defines the gap and two contact antenna ends in this example, it should be appreciated that the laser cutting path 215 can easily and quickly be altered simply by loading a new laser cutting path program into the computer 400 to create other cutting or patterns to be produced in the antenna structure subsequent to the attachment pattern or simultaneously with or prior to the attachment pattern. Accordingly, the disclosed roll-to-roll process makes the production of small batches of specialized antennas with very unique variations of the exemplary standard antenna structures economically sustainable or makes the production of very intricate designs more feasible for such finite batches of antennas.

Figure 10:
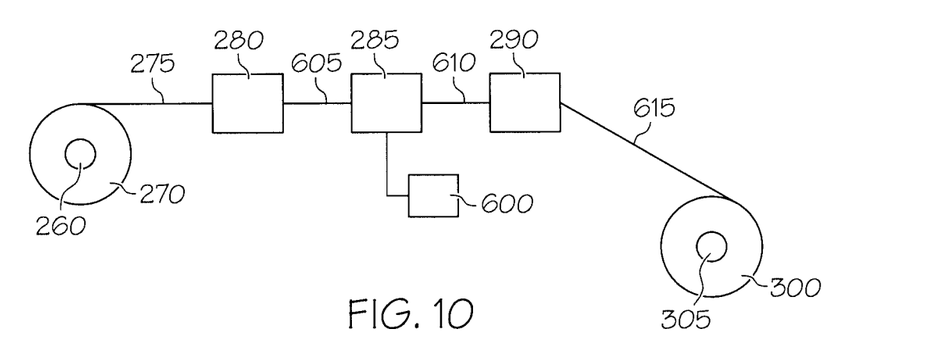
FIG. 10 depicts a roll-to-roll process for manufacturing modified RFID tags in accordance with an aspect of the present invention.

Referring now to FIG. 10, a roll-to-roll process for manufacturing a modified RFID tag in accordance with an aspect of the present invention is shown. As used herein, a modified antenna structure refers to the process of taking a previously formed antenna structure especially since it's from a collection of standardized patterns and then further adapting that structure to meet a particular end use application or to complete the manufacture of a specific design.

An antenna structure web 275 is dispensed from an antenna structure roll 270 via an unwinder 260. For the purposes of this exemplary embodiment, it will be assumed that the antenna structure roll 270 shown in FIG. 10 was created by the roll-to-roll process depicted in FIG. 3. However, any other suitable methods may be employed to create the antenna structures such as a sheet feed method. The antenna structure web 275 is fed into a microprocessor attachment apparatus 280. The microprocessor attachment apparatus 280 secures a microprocessor to the antenna structures being advanced through the microprocessor attachment apparatus 280 thereby creating a direct electrical connection between the microprocessor and the antenna structure.

Referring back to FIG. 2 the completed standard RFID tag 50 illustrates where the microprocessor attachment apparatus 280 (FIG. 14) places the microprocessor 85 in relation to the antenna structure 55. The microprocessor attachment apparatus 280 secures one end of the microprocessor 85 to the antenna structure 55 at the first contact end 75, and the other end of the microprocessor 85 to the second contact end 80 such that the microprocessor extends across the gap 70. The microprocessor attachment apparatus 280 can secure the microprocessor 85 to the antenna structure 55 via an electrically conductive adhesive, a weld (e.g., spot weld), ultrasonic bonding, mechanical crimping or by any other suitable means that allow an electrical current to flow through the microprocessor 100 and around the antenna structure 55.

It should be appreciated that the high-resolution cutting capabilities of the laser cutter 175 allows the laser cutter 175 to create a gap that is narrow enough to allow for the direct attachment of a microprocessor to the standard antenna structure without the use of any contact extensions. The absence of contact extensions may simplify the manufacturing process, decreases manufacturing costs, and eliminate a potential failure point (e.g. contact connection point). It should however be understood that contact extensions or a strap or lead frame can also be used in connection with the current process. In some instances, depending on the size of the strap or lead frame, different performance can be obtained by using the same antenna but with a different sized strap.

Figure 11:
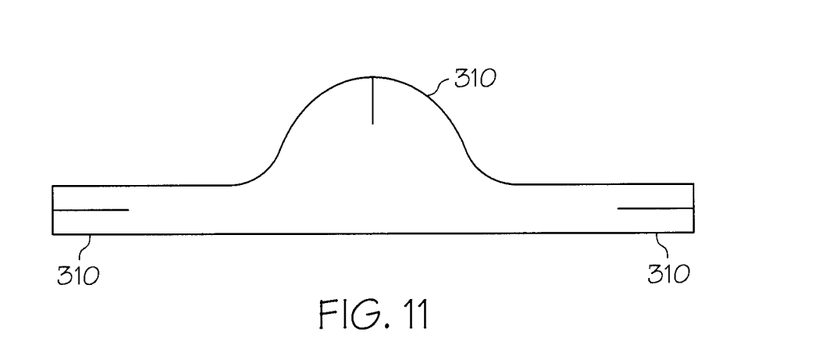
FIG. 11 is a top view of an exemplary secondary cutting path utilized by the present invention.
Figure 12:
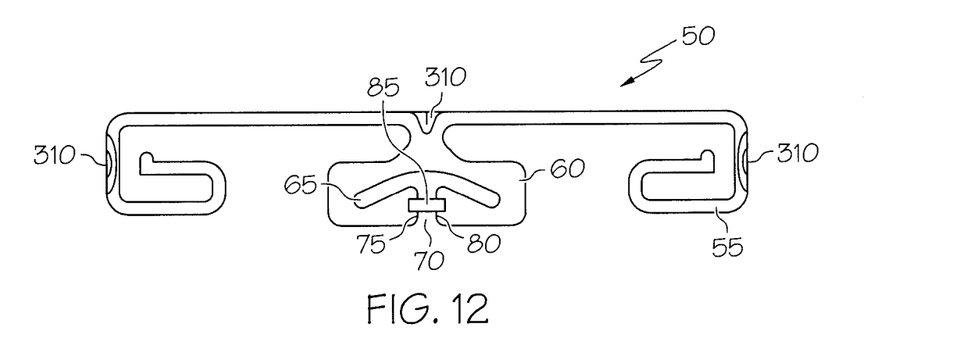
FIG. 12 is a top view showing the placement of the secondary cutting path shown in FIG. 10 on the standard RFID tag shown in FIG. 2.

The present invention may also be used to create unique or adaptable antennas with multiple contact points (or a graduated contact point) that allows for both direct attachment of a microprocessor or with a strap at a different point without changing the design of the antenna Referring back to FIG. 10, the antenna structure web 275 exits the microprocessor attachment machine 280 as an RFID tag web 605. The RFID tag web 605 has a succession of RFID tags disposed on the carrier layer. The RFID tag web 605 is fed into a second or subsequent laser cutter 285 to make the modifications to the initial antenna structure. A supplementary laser cutting path 310 (an exemplary embodiment of which is shown in detail in FIG. 11) is programmed into a second computer 600 that controls the second laser cutter 285. As the RFID tag web 605 is fed through the second laser cutter 285, the second laser cutter 285 positions the supplementary laser cutting path 310 onto the RFID tags as shown in FIG. 12. As the RFID tags advance through the second laser cutter 285, the second laser 285 cutter traces the positioned supplementary laser cutting path 310 while continuously ablating the conductive layer and the adhesive layer to alter the shape of the RFID antenna structure to create a modified antenna structure for use for example with a RFID tag, label, ticket or inlay.

Figure 13:
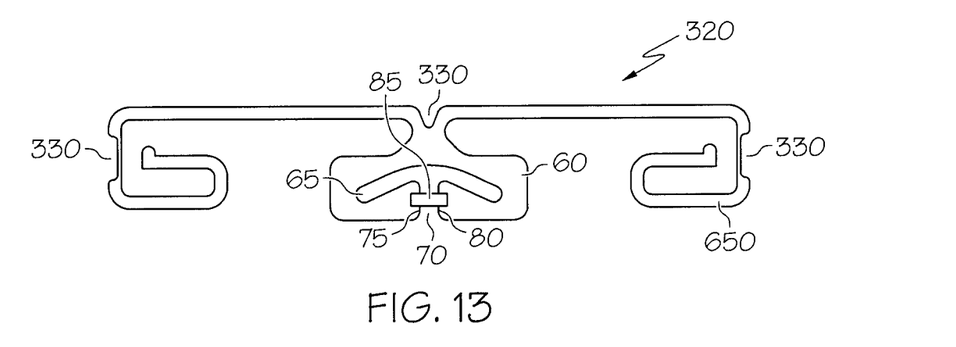
FIG. 13 is a top view of a completed modified RFID tag created by a method disclosed by the present invention.

A modified RFID tag 320 is shown in FIG. 13. The modified RFID tag 320 shares the same basic layout and structure as the RFID tag 50 shown in FIG. 2. The modified RFID tag 320 has a modified RFID antenna structure 650. The modified RFID tag 320 differs from the RFID tag 50 only in that the modified RFID tag 320 has a plurality of scallops 330 provided in the periphery portion of the modified RFID antenna structure 650. In addition to scallops, other shapes or other portions of the antenna can be easily created and the material removed from the conductive material.

It should be noted that the supplementary cutting path 310 is designed preferably only to make slight alterations to the shape of the standard antenna structure so as to provide further flexibility of the standard antenna design. Alternatively, the second laser cutter 285 can also be used to radically alter the physical appearance of the standard antenna structure and to make material changes in the standardized structure when needed.

Referring back to FIG. 10, the RFID tag web 605 exits the second laser cutter as a modified RFID tag web 610. The modified RFID tag web 610 has a succession of modified RFID tags disposed on the carrier layer. The modified RFID tag web 610 is fed into a separator 290. The separator 290 removes the completed modified RFID tags from the carrier layer 130 so that the completed modified RFID tags may be further processed, such as with the addition of a microprocessor, additional printing and the like. The carrier layer 615 is then wound into a carrier roll 300 by a third rewinder 305.

Figure 14:
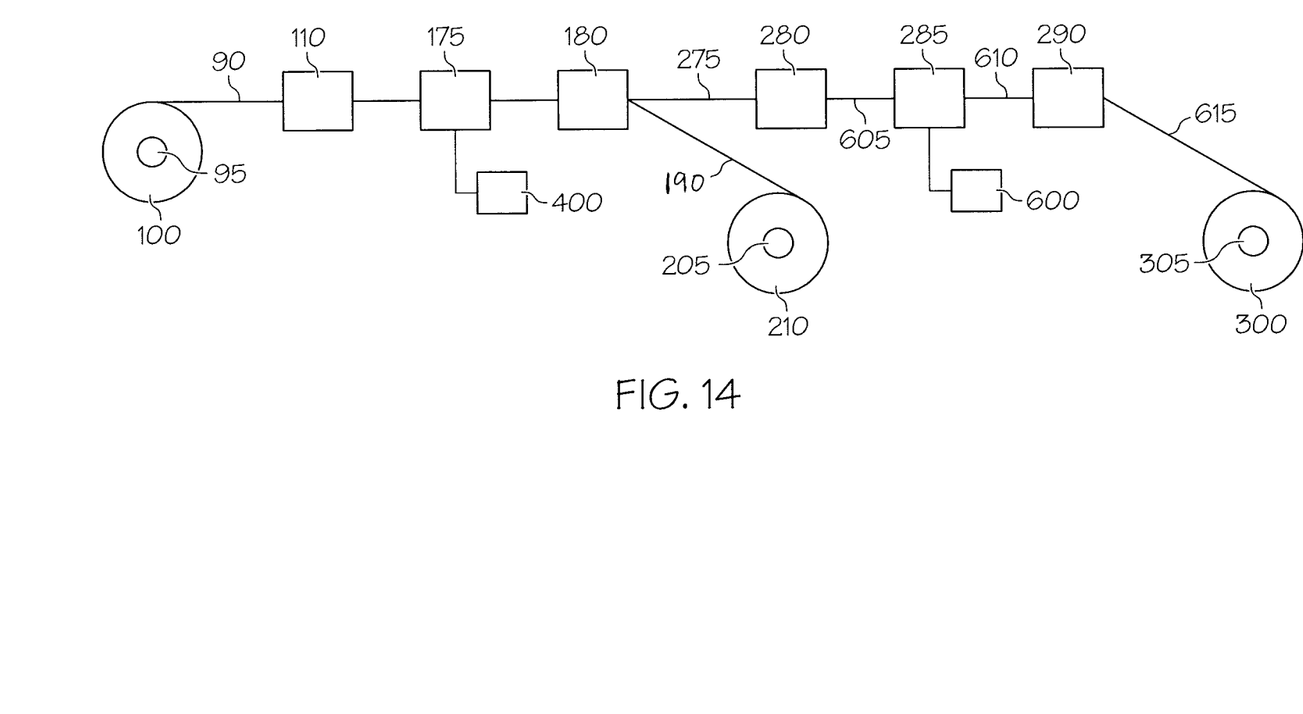
FIG. 14 depicts another roll-to-roll process for manufacturing modified RFID tags in accordance with an aspect of the present invention.

It is contemplated that the roll-to-roll process depicted in FIG. 3 and the roll-to-roll-process depicted in FIG. 10 may be combined to create another roll-to-roll process of manufacturing modified RFID tags, which is depicted in FIG. 14.

Figure 15:
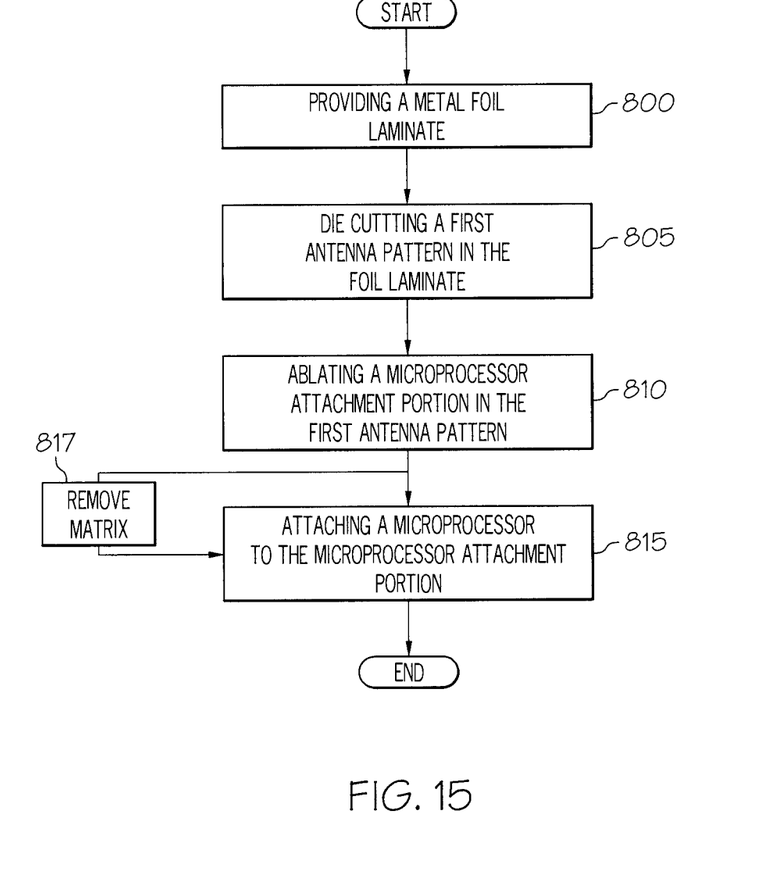
FIG. 15 illustrates a methodology of creating a standard RFID antenna in accordance with an aspect of the present invention.

FIG. 15 illustrates a methodology of forming an RFID antenna structure. The methodology begins at 800, where a conductive layer disposed on a carrier layer is provided. The conductive layer can include a metal foil layer (aluminum, copper, various alloys, etc.) partially bonded to a carrier layer by an adhesive layer or a conductive layer may be presented solely by itself. The conductive layer can be bonded to the carrier by an adhesive layer or may simply lie on the carrier. At 805, a die is used to cut a basic antenna structure, one of the standardized templates, through the conductive layer up to the carrier layer. The cutting can be accomplished by a die cutter, laser cutter or cold foil impression process. The basic antenna structure does not include a microprocessor attachment portion. At 810, a laser modifies the basic antenna structure to create a modified antenna structure by ablating the conductive layer up to the carrier layer in the basic antenna structure cut by the die to create a microprocessor attachment portion. The laser attachment portion can include at least two microprocessor contact ends separated by a gap. The methodology concludes at 815, with the attachment of a microprocessor to the microprocessor attachment portion. Alternatively, at step 817, where matrix removal is required, a stripper removes the matrix portion of the reinforced conductive layer from the antenna structure such that only the antenna structure remains on the carrier layer. It should be understood, that no matrix may be removed, or it may only be removed at select potions of the process such as when a rotary die cutter is used and not in other instances for example when a laser cutting device is used. Alternatively, no matrix may be removed from the structure and ablate the surrounding material.

Figure 16:
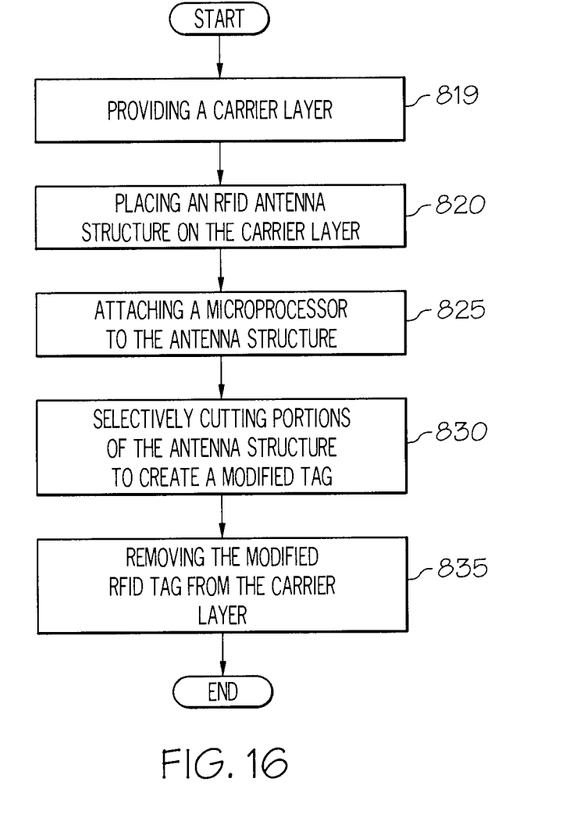
FIG. 16 illustrates a methodology of creating a modified RFID tag in accordance with an aspect of the present invention.

FIG. 16 illustrates an exemplary embodiment for manufacturing a modified RFID tag. The methodology begins at 819 by providing a carrier layer and then at 820 an antenna structure is disposed on a carrier layer. The antenna structure has a microprocessor attachment portion that includes at least two microprocessor contact ends separated by a gap. The finished antenna structure may be created by the methodology described in detail above illustrated in FIG. 15, or by any suitable method that creates a gap that is narrow enough to allow a microprocessor to bridge the gap without the use of contact extensions. At 825, a microprocessor is secured to the antenna structure to create a direct electrical connection between the antenna structure and the microprocessor, thereby creating an RFID device such as an RFID tag. The microprocessor extends over the gap and while being secured to both of the at least two contact ends. At 830, a laser ablates select portions of the antenna structure to modify the shape of the RFID antenna to create a modified RFID tag. The methodology concludes at 835, where the modified RFID tag is removed from the carrier layer to allow for further processing.

Figure 17:
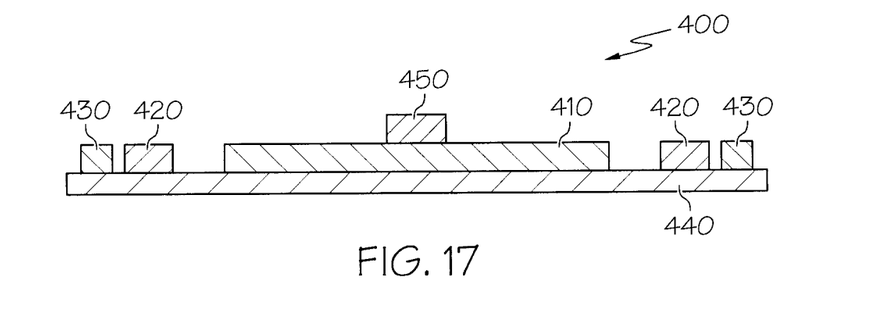
FIG. 17 provides a side elevation of a conductive laminate produced in accordance with the present invention.

Reference is now directed to FIG. 17 in which a side elevation of a conductive laminate for use in a RFID tag is shown generally by reference to numeral 401. The laminate 401 includes a microprocessor 450, first antenna pattern 410, a second antenna pattern 420 and a third antenna pattern 430 each of which is disposed on a carrier layer 440. The first 410 and second 420 antenna patterns are in cooperative association with one another. The antenna patterns are created for example by laser cutting such that no visible marks may be made on the surface of the carrier layer of substrate. The antenna patterns are generally distinguishable from one another, may cooperate with one another or may be partially coincident with one another. The third antenna pattern is in cooperative association with the first and second antenna patterns, or alternatively, the third pattern can be unrelated to the form and function of the antenna and may instead provide other forms of identification such as a logo, name or the like.

In another embodiment of the present invention, a pattern for a strap attachment mechanism rather than for a chip attachment for an RFID device may be patterned in the conductive layer using one or more of the methods described herein.

It will thus be seen that a novel method for manufacturing radio frequency identification tags in a continuous and efficient manner using a combination of die cutting and laser cutting that allows for the placement of a microprocessor directly onto a radio frequency identification antenna has been disclosed. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. A method of manufacturing an antenna structure for a radio frequency identification (RFID) tag, comprising the steps of:

providing a conductive layer, a two part adhesive layer in which one part is tacky and another part is not tacky, and a carrier layer supporting the conductive layer and the adhesive layer;

cutting a first antenna pattern through the conductive layer wherein the cutting includes performing a partial die cut with one of a rotary die cutter or a laser cutter up to the carrier layer but not through the carrier layer and through the conductive layer and the adhesive layer;

creating a microprocessor attachment portion by further cutting in the first antenna pattern to create a RFID antenna structure; where the microprocessor attachment portion in the first antenna pattern includes ablating the conductive layer using a computer controlled cutting laser; and attaching a microprocessor to the microprocessor attachment portion wherein the RFID antenna structure has multiple contact points allowing for one of a direct attachment point for the microprocessor or a strap attachment point each being different points on the RFID antenna structure without changing a design of the RFID antenna structure.

2. The method of claim 1, wherein the microprocessor attachment portion ablated by the laser cutter is generally t-shaped to define a gap that separates a first antenna contact end from a second antenna contact end.

3. The method of claim 2, including a further step of removing at least a matrix portion from the first antenna pattern after the step of cutting a first antenna pattern.

4. The method of claim 1, where tracing is done by a positioned supplementary second laser cutter on a supplementary laser cutting path while continuously ablating the conductive layer and the adhesive layer to alter the shape of the RFID antenna structure to create a modified antenna structure.

5. A method of manufacturing a radio frequency identification (RFID) tag comprising the steps of:
providing a carrier layer;
placing a conductive material on the carrier layer such that the conductive layer is attached to the carrier layer by an adhesive layer wherein a plurality of patterned registration marks is provided on top of one of the adhesive or carrier layer;
cutting portions of the conductive material with a computer controlled laser to form an RFID antenna structure to create an RFID tag such that the plurality of registration marks are provided to assist in the cutting of a pattern for the RFID antenna structure which the laser uses while continuously ablating the conductive material and the adhesive layer;
selectively cutting with the laser additional portions of the RFID tag to create a modified RFID tag and forming at least one of a logo, indicia, name or combinations thereof;
creating a microprocessor attachment portion by further cutting in the antenna structure;
removing the modified RFID tag from the carrier layer;
tracing by a second laser cutter on a cutting path the conductive layer and the adhesive layer to alter the shape of the RFID antenna structure to create a modified antenna structure; and
attaching a microprocessor directly to the RFID antenna structure to create a standard RFID tag.

6. The method of claim 5, wherein the microprocessor is directly attached to the RFID antenna structure at a microprocessor attachment portion of the RFID antenna structure.

7. The method of claim 5, wherein the antenna structure has a microprocessor attachment portion that is generally t-shaped that defines a gap that separates a first antenna contact end from a second antenna contact end.

8. The method of claim 7, wherein the microprocessor is attached directly to the RFID antenna structure at the first antenna contact end and the second antenna contact end.

9. The method of claim 5, wherein the microprocessor is attached directly to the RFID antenna structure through the use of at least one of ultrasonic welding, crimping, adhesive bonding or combinations thereof.

10. The method of claim 5, wherein the step of selectively cutting portions of the antenna is practiced prior to the step of attaching the microprocessor.

11. A method of manufacturing a radio frequency identification (RFID) tag, comprising the steps of:
providing a conductive layer having a metal foil layer bonded to a carrier layer in areas where an antenna pattern is to be formed, the metal foil layer is bonded to the carrier layer by an adhesive layer;
cutting a first antenna pattern in the conductive layer;
cutting a second pattern in the first antenna pattern to create a RFID antenna structure wherein the cutting includes performing a partial die cut up to the carrier layer through the conductive layer and the adhesive layer and the conductive layer and RFID antenna structure are manufactured in a continuous roll to roll process;
selectively cutting with portions of one of the first and second patterns in the RFID antenna structure to create a modified RFID tag;
creating a microprocessor attachment portion by further cutting in the antenna structure and attaching a microprocessor such that none of the conductive layer is present in the microprocessor attachment portion; where the microprocessor attachment portion in the first antenna pattern includes ablating the conductive layer using a computer controlled cutting laser;
tracing by a laser cutter on a laser cutting path the conductive layer and the adhesive layer to alter the shape of the RFID antenna structure to create a modified antenna structure; and
removing the modified RFID tag from the carrier layer.

12. The method of claim 11, wherein a microprocessor attachment portion is formed in the antenna pattern is generally t-shaped void and defines a gap that separates a first antenna contact end from a second antenna contact end.

13. The method of claim 12, wherein the microprocessor is directly attached the microprocessor attachment portion of the RFID antenna structure at the first antenna contact end and the second antenna contact end.

14. The method of claim 11, wherein the step of selectively cutting portions of the RFID antenna structure to create a modified RFID tag includes ablating the conductive layer using a computer controlled cutting laser.

15. The method of claim 11, wherein the microprocessor is attached directly to the RFID antenna structure through at least one of ultrasonic welds, electrically conductive adhesive, mechanical crimping or combinations thereof.

16. The method of claim 11, wherein the cutting of the basic antenna pattern through the conductive layer includes performing a partial cut with one of a rotary die cutter or cold foil process.

* * * * *